(12) United States Patent
Leibold

(10) Patent No.: US 6,558,443 B2
(45) Date of Patent: May 6, 2003

(54) METHOD AND ARRANGEMENT FOR CLEANING FILTERS

(75) Inventor: Hans Leibold, Malsh-Waldprechtsweier (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 09/945,437

(22) Filed: Sep. 1, 2001

(65) Prior Publication Data

US 2002/0029692 A1 Mar. 14, 2002

Related U.S. Application Data

(63) Continuation-in-part of application No. PCT/EP00/02842, filed on Mar. 31, 1999.

(30) Foreign Application Priority Data

Apr. 16, 1999 (DE) .......................................... 199 17 168

(51) Int. Cl.[7] .............................................. B01D 29/68
(52) U.S. Cl. ............................ 55/302; 55/284; 55/291; 95/278; 95/280; 210/411; 210/412; 210/433.1; 210/333.01
(58) Field of Search ........................ 55/284, 291, 294, 55/302; 95/278, 279, 280; 210/411, 412, 433.01, 333.01

(56) References Cited

U.S. PATENT DOCUMENTS

| | | | |
|---|---|---|---|
| 3,864,108 A | | 2/1975 | Brookman |
| 4,533,471 A | * | 8/1985 | Collins, Jr. .................. 210/138 |
| 4,632,679 A | * | 12/1986 | Klimczak ..................... 55/284 |
| 5,587,074 A | * | 12/1996 | Lynch et al. ................. 210/411 |
| 5,632,902 A | * | 5/1997 | Kalman ....................... 210/741 |
| 5,752,539 A | * | 5/1998 | Kalman ....................... 137/13 |

FOREIGN PATENT DOCUMENTS

| | | |
|---|---|---|
| DE | 90 00 579.1 | 5/1990 |
| EP | 0 551 951 | 7/1993 |

\* cited by examiner

Primary Examiner—Winh-Chan T. Pham
(74) Attorney, Agent, or Firm—Klaus J. Bach

(57) ABSTRACT

In a method and apparatus for cleaning filters in which raw gas with particles suspended therein is conducted from a raw gas space to a clean gas space and through which intermittently a back-flushing gas is conducted from the clean gas space to the raw gas space, a flow dynamic control element is disposed in the clean gas space which blocks the outflow of gas from the clean gas space when a back-flushing gas is admitted to the clean gas space under a pressure, which exceeds the filter operating pressure so as to prevent excessive back-flushing gas losses during back-flushing. The flow dynamic control element is switched between an open and a blocking state by the pressure changes in the clean gas space without including any movable parts.

6 Claims, 1 Drawing Sheet

METHOD AND ARRANGEMENT FOR CLEANING FILTERS

This is a Continuation-In-Part application of international application PCT/EP00/02842 filed Mar. 31, 1999 and claiming the priority of German application 199 17 168.8 filed Apr. 16, 1999.

BACKGROUND OF THE INVENTION

The invention relates to a method and arrangement for cleaning filters through which raw gas with particles suspended therein flows from a raw gas space to a clean gas space, whereby the particles are collected on the filter and through which, from time to time, a back-flushing gas is conducted from the clean gas space to the raw gas space while any outlet from the clean gas is blocked to dislodge and carry away particles collected on the filter.

The invention is particularly concerned with the cleaning of compact filters while they remain installed in a filter housing. Cleaning units, which also operate according to the same principle, generally include a movable member, which is moved in the clean gas space over the filter elements and partially or fully seals off the filter elements. This member is operated, directly or indirectly, generally by mechanical and pneumatic drive units. Another arrangement for cleaning a filter comprises round or slot-like nozzle systems at the clean gas side of the filter element. Such devices are known in connection with hose and pocket-type filters.

Such mechanical cleaning arrangements are subject to failure and involve relatively high design and construction expenses. Critical is the seal toward the filter elements, which is achieved by way of a flexible seal that is subjected to high wear. With the guiding of the movable member at the same time a high sealing force has to be applied which increases the wear of the seal. With regard to the large number of cleaning cycles, the whole design must be made to be very sturdy. As a result, the structure is relatively heavy so that high drive forces are required, the design is relatively expensive and the cleaning of large filter elements is complicated. It has therefore been tried to clean several filter elements at the same time, whereby however, the back-flushing air volume available per filter element is reduced. With the use of movable parts for driving the member, the acceptable gas temperature is substantially lower than the temperature, which the filter element can withstand.

The embodiment which uses rigidly mounted nozzles involve unacceptably high expenses for large filter systems particularly with pleated filters having deep pleats and 50 or more pleats in each filter element. Since there is no direct coupling of the cleaning unit with the filter, only low cleaning intensities can be generated.

DE-U-9000579 discloses a filter apparatus with split filter cartridges, wherein the split filter cartridges can be cleaned from the clean gas side by means of a back-flushing gas flow. In that arrangement for each split filter cartridge, there is provided a check valve in the form of a closing flap, that is, a moving part which, at a predetermined pressure, blocks the gas flow from the filter cartridge. For cleaning the filter cartridges, the back-flushing gas is introduced into the clean gas space between the split filter cartridge and the check valve, whereby the check valve is closed by the increased gas pressure, and the split filter cartridge is cleaned by a counter-current gas flow through the filter into the raw gas space.

Further, EP 0 551 951 B1 discloses a method for cleaning filters, through which a raw gas is conducted from one side, by back-flushing of the filters from the clean gas side. The flushing gas stream required for the back-flushing is conducted through chambers disposed between the filters and a second filter surface. This second filter surface has a permeability, which is greater than that of the filter to be cleaned by a factor of 3–5 and a larger pore size and a filter surface area, which is smaller than that of the filter to be cleaned by a factor of up to 10. In this arrangement, which has no moving parts, the back-flushing gas flow is conducted through this second filter area and is therefore limited.

It is the object of the present invention to provide a method and arrangement for cleaning cartridge-type aerosol filters in an efficient and effective manner without the use of movable components, which are subject to failure.

SUMMARY OF THE INVENTION

In a method and apparatus for cleaning filters in which raw gas with particles suspended therein conducted from a raw gas space to a clean gas space and through which intermittently a back-flushing gas is conducted from the clean gas space to the raw gas space, a flow dynamic control element is disposed in the clean gas space which blocks the outflow of gas from the clean gas space when a back-flushing gas is admitted to the clean gas space under a pressure, which exceeds the filter operating pressure so as to prevent excessive back-flushing gas losses during back-flushing. The flow dynamic control element is switched between an open and a blocking state by the pressure changes in the clean gas space without including any movable parts.

The invention therefore provides for a method and arrangement with which the filters can be cleaned efficiently and effectively in a simple manner without the use of moving parts. Larger filter units can therefore be very compact in design and economical to construct which is highly advantageous for the use of back-flushable aerosol filters for example in power generation plants.

Particulars of the invention will become more readily apparent from the following description on the basis of the accompanying drawings.

DESCRIPTION OF A PREFERRED EMBODIMENT

With the filter arrangement shown in the figures, a method for cleaning filters through which raw gas is conducted from one side thereof, such as large-surface area aerosol filtes formed from pleated filter material in the form of, for example, filter cartridges, by back-flushing of the filters from the clean gas side thereof. In this procedure, the air required for the back-flushing is conducted through the filter material from the clean gas space behind the filters while the outlets of the clean gas space are blocked. The blocking of the clean gas space outlets is achieved by a flow-dynamic control element 6, which has no moving parts. It includes passages, which provide little restriction at the normal relatively low operating pressures in the filter but which are blocked when the higher back-flushing pressure is effective. The cleaning step is performed under normal process pressure with a back-flushing pressure superimposed, which is higher than the normal process pressure. Preferably, the back-flushing gas is introduced in a pulsed manner. The pressure difference, which controls the permeability of the flow-dynamic control element 6, is in the area of 100 to 250 Pa at a flow speed of 2.5 cm/sec.

Figure 1:
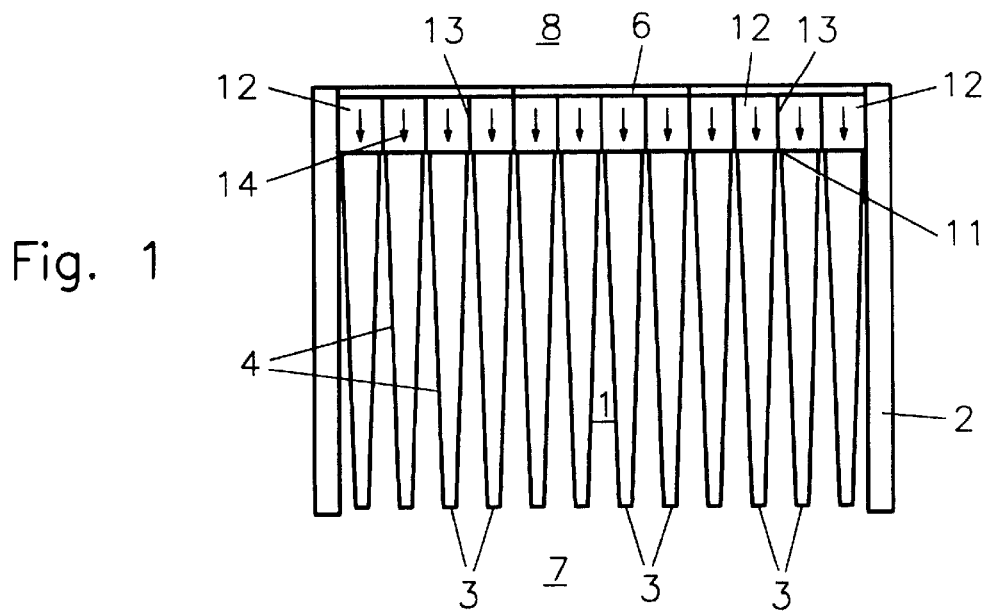
FIG. 1 is a cross-sectional view of a filter element used in connection with the method and arrangement according to the invention.
Figure 2:
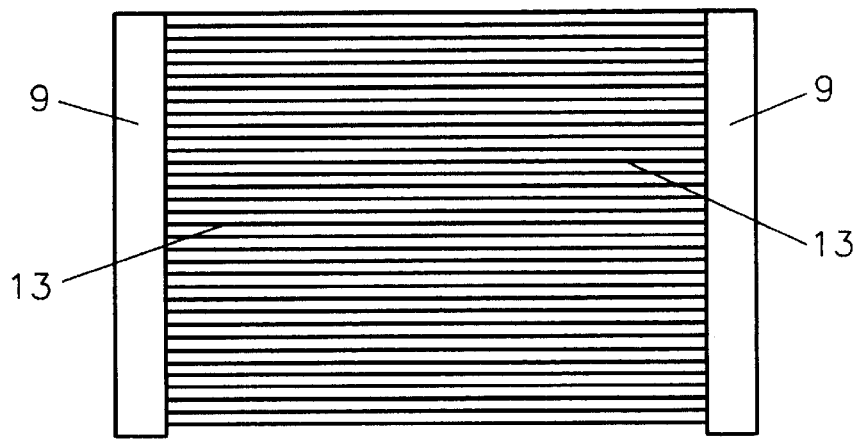
FIG. 2 is a top view of the filter element shown in FIG. 1, turned by 90°.
Figure 3:
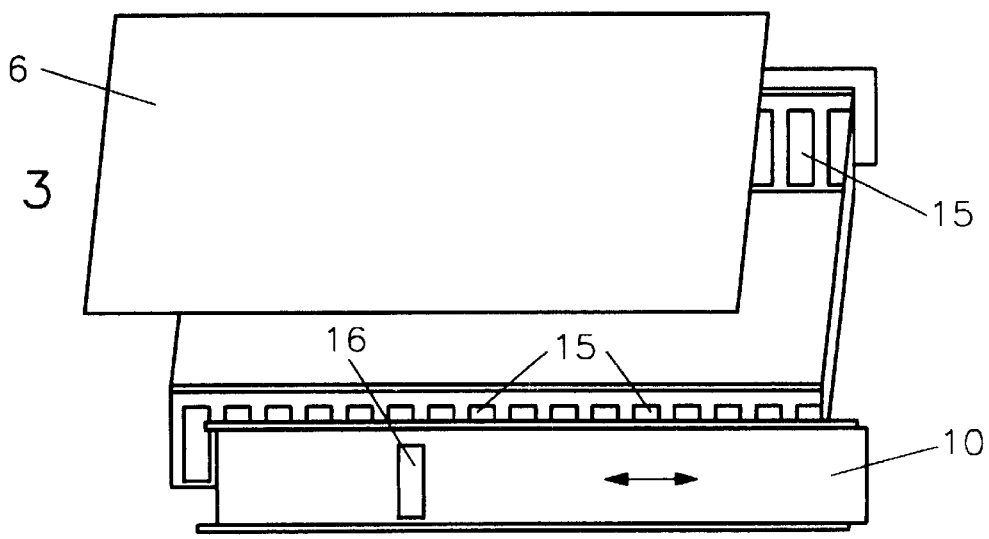
FIG. 3 is a perspective view with the flow-dynamic control element lifted off the filter structure.

As shown in the figures, the filter arrangement comprises a filter cartridge 1 consisting of a frame 2 in which a pleated pack 3 of the filter material is tightly supported. The pleated filter pack 3 may have bracing members for stabilizing the arrangement or it may be self-supporting. At the clean gas side, above the cartridge filter, there is a back-flushing unit which distributes the back-flushing air 14 to the different pleats of the filter pack 3. The back-flushing air unit may be a separate unit or it may also be an integral part of the filter cartridge 1. The back-flushing air unit consists of the chamber walls 13, which, at the filter cartridge end, tightly engage the edges 11 of the filter pleats. Toward the clean gas space 8, they are tightly connected to the flow-dynamic control element 6 so as to form chambers 12 between the control element 6 and the filter cartridges. These chambers 12 are also part of the clean gas space 8. At the opposite front sides, the chambers 12 are delimited by separately controllable openings 15 (see FIG. 3) or by a perforated web, which forms the inner wall of the back-flushing air distributor 9. These back-flushing air distributors 9 are shown in FIG. 2. They conduct the back-flushing air from the (in FIG. 1 from the front and the rear sides) into the chambers 12. In the embodiment with perforated webs as shown, revolving belts 10 are so arranged that an opening 16 is brought into alignment, in succession, with all the openings 15 of the perforated webs while, at the same time, the other openings 15 are blocked. By control elements which are not shown in both back-flushing air distributors 9, the openings 15 of one pleat structure 3 are opened at a given time so that the back-flushing air can enter the particular pleat placed in communication with the distributors 9.

During the filtration process, all the openings 15 to the back-flushing air distributors are closed. The gas to be cleaned reaches the pleated filter pack 3 at the raw gas side 7 and flows through the filter structure 4, whereby any dust is collected on the raw gas side 7 of the filter structure 4. The cleaned gas passes through the clean gas side pleat space of the filter pack 3 to the chambers 12 and leaves the filter through the flow dynamic control element 6.

During the cleaning step, first both openings 15 to the first pleat space adjacent to the frame 2 are unblocked. The back-flushing air or a back-flushing gas 14 flows from the back-flushing air distributors 9 into the respective chamber 12 and into the clean gas-side pleat area disposed below. As a result of the flow resistance of the filter structure 4 and the fiber structure of the flow dynamic control element 6, an excess pressure is generated within the chamber 12 and the respective pleat area below. The gas flow direction through the filter structure 4 is reversed and the dust deposited on the outside of the filter pleats is dislodged and carried away. The flow resistances of the filter structure 4 and of the flow dynamic control element 6 are so adapted to each other that, during back-flushing at the increased pressure, the flow openings of the flow dynamic control element are essentially closed. Not more than 10% of the back-flushing airflow passes through the flow dynamic control element and is lost.

During filtering operation, the flow dynamic control element 6 has a higher permeability than the filter structure 3. With a suitable design of the flow dynamic filter 6 providing for a pressure-dependent variable flow resistance, the leakage volume flow can be almost blocked. The filter structure or fabric of the flow-dynamic filter 6 acts as a flow valve, which closes during back-flushing and is fully open during the filtering step. The flow resistance is preferably so selected that the additional pressure losses during filtration are at most 30% at typical filtration speeds of 2.5 cm/sec.

As materials for the flow dynamic control element 6, glass fiber, plastic fiber and metal fiber fleeces as well as fabrics of the same materials may be used. Also, plastic or metal sinter materials may be used. Also, plastic or metal sinter materials and perforated plastic and metal masks with uniformly arranged or statistically arranged openings as well as foamed materials may be used. Also, combinations of different or several of these materials are possible. The filter operation occurs at ambient pressure. The back-flushing operation occurs at ambient pressure. The back-flushing procedure is performed at a pressure in the area of 50–100 mbar excess pressure.

What is claimed is:

1. A method of cleaning filters through which raw gas with particles suspended therein flows from a raw gas space to a clean gas space whereby the particles are collected on the filter and through which intermittently a back-flushing gas is conducted from the clean gas space to the raw gas space to dislodge and carry away any particles collected on the filters while gas flow out of the clean gas space is blocked by a flow control element arranged in the clean gas space downstream of said filters, said method comprising the steps of: intermittently admitting to the area of said clean gas space between said filters and said flow control element a back-flushing gas whereby the gas pressure in said clean gas space between said filters and said flow control element is increased, said flow control element being a flow-dynamic element, which has a low flow resistance under normal filtering operation pressure conditions, but which is transferred to a blocking state when the pressure is increased by the admission of the back-flushing gas to said clean air space, thereby limiting leakage flow of back-flushing gas during back-flushing, said dynamic flow control element having no moving parts and being made of at least one of the materials including glass fibers, plastic material fiber and metal fiber fleeces and fabrics of these materials, perforated plastic and metal masks with uniformly and statistically arranged openings and foamed materials.

2. A method according to claim 1, wherein said flow dynamic control element has a higher permeability than the filter during normal filtering operation.

3. A method according to claim 1, wherein back-flushing is performed with a pressure which is higher than the pressure effective during filtering operation.

4. A method according to claim 3, wherein the back-flushing gas is admitted to said filter in a pulsed manner.

5. An arrangement for the cleaning of filters including flat filter elements disposed in a filter housing with a clean gas space and a raw gas space from which a gas to be cleaned flows through the filter elements to the clean gas space while dust particles are removed from the gas and deposited on the raw gas side of the filter elements, said clean gas space including an outlet for the clean gas and an inlet for the back-flushing gas and a flow dynamic control element arranged, in flow direction of the gas to be cleaned, behind said filter elements and having no moving parts, said flow dynamic control element having a high permeability when subjected to the filter operating pressure effective in the clean gas space during filtering operation but being transformed into a blocking state when subjected to the excess pressure of the back-flushing gas.

6. An arrangement according to claim 5, wherein the pressure drop determining the permeability of the flow dynamic control element is in the range of 30 to 60 Pa at a flow speed of 2.5 cm/sec.

* * * * *